Figure 1:
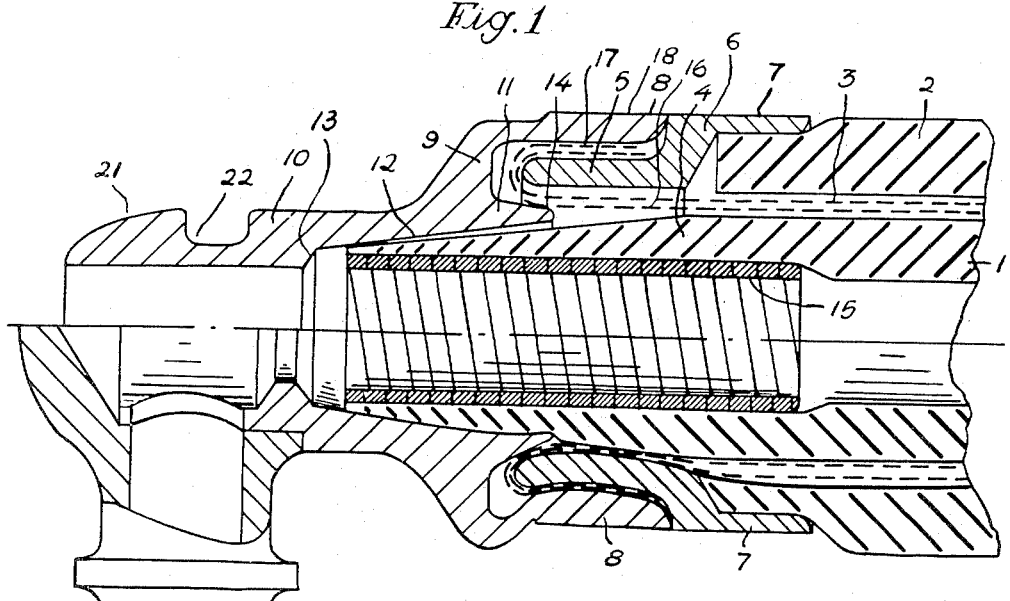

July 3, 1956  W. A. MELSOM  2,753,196
COUPLING FOR FLEXIBLE PLURAL LAYER HOSE
Filed Sept. 25, 1951  3 Sheets-Sheet 1

Inventor:
Walter Arthur Melsom
By Cushman, Darby & Cushman
Attorneys

July 3, 1956     W. A. MELSOM     2,753,196
COUPLING FOR FLEXIBLE PLURAL LAYER HOSE
Filed Sept. 25, 1951     3 Sheets—Sheet 2
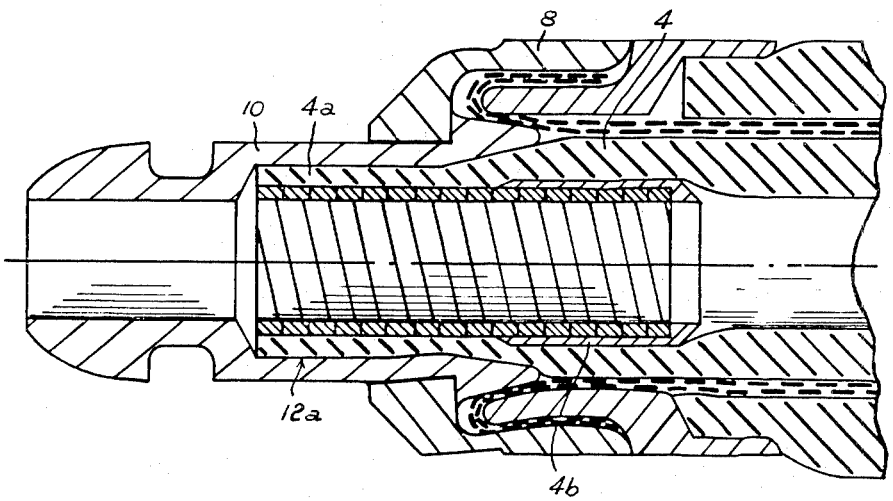
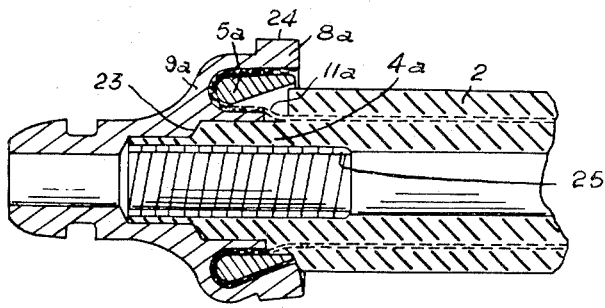
Inventor:-
Walter Arthur Melsom
By Cushman, Darby & Cushman
Attorneys

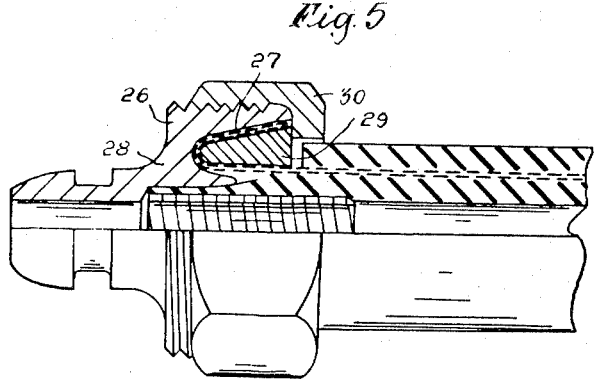
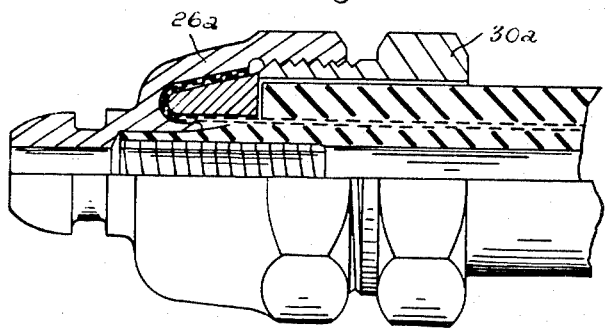
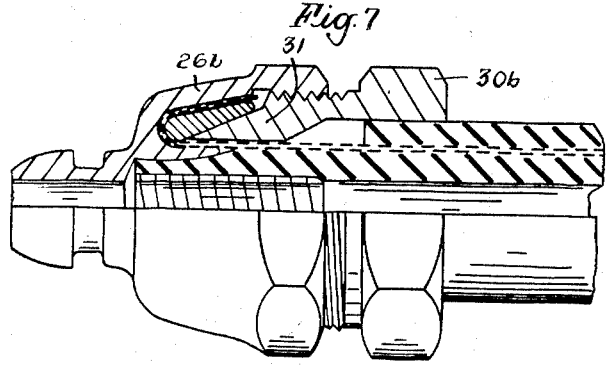

United States Patent Office 2,753,196
Patented July 3, 1956

2,753,196

COUPLING FOR FLEXIBLE PLURAL LAYER HOSE

Walter Arthur Melsom, Wembley, England, assignor to Bowden (Engineers) Limited, London, England Application September 25, 1951, Serial No. 248,125

Claims priority, application Great Britain April 6, 1950

8 Claims. (Cl. 285—149)

The present application is a continuation-in-part of my application Serial No. 218,735, filed April 2, 1951, for Flexible Hose Couplings and the invention relates to improvements in high pressure hose coupling components of the kind employing a flexible hose with inner and outer tubular layers of resilient material such as rubber (natural or synthetic) and a tubular layer of flexible reinforcing material embedded between them, and an end fitting by which the coupling may be connected to other apparatus. In such couplings the hose is connected to the end fitting by direct gripping of the bared reinforcing material brought about by means of an outer sleeve of the outer part of the end fitting, preferably by the contraction of such sleeve. The reinforcing material can be flared outwards and may consist of ribbon like groups of fine high tensile steel wires braided to tubular form. The reinforcing layer is preferably of metal, although it may have a fabric covering or it may be of fabric if one or both of the metal gripping parts are sufficiently soft to grip it without damage. The end fitting also comprises an insert fitting into the end of the hose. A hose is a high-pressure hose when it is suitable for use with pressure above 500 lbs. sq. inch. Coupling components having the above features are coupling components of the kind specified.

In such coupling components the hose must be sealed to the end fitting to prevent the escape of any fluid and this is generally achieved by contracting an outer sleeve of the fitting onto the hose so that the resilient material within the fitting is under powerful compressive force to press the inner layer of the hose firmly upon an insert.

Difficulties arise where coupling components so sealed are subjected to widely varying temperature conditions and under tensile stress involved under working conditions, which difficulties are enhanced if widely varying qualities of rubber are encountered, as they may be in practice. The high temperatures tend to result in displacement of the rubber without subsequent elastic recovery and the efficiency of the coupling component is impaired.

The object of the present invention is to provide an improved form of coupling component which will maintain a more uniform performance under these circumstances. This object we aim to realize by avoiding powerful compressive forces on the rubber of the hose, and by appropriately utilising the flexible properties of the rubber or rubber-like substance of the inner layer of the hose as a means of obtaining a seal against the escape of fluids contained in the hose under high pressures.

More specifically an object of the invention is to enable a portion of the inner layer which is to be used as a sealing member to be exposed before assembly so that its sealing face may be readily prepared.

According to this invention a flexible hose coupling of the kind specified is characterised in that (a) an end portion of the inner resilient layer projects beyond the outer layer and the reinforcing layer also projects beyond the outer layer and is bare of the inner layer; (b) the reinforcing layer passes through the inside of a ring and is folded back on the outside thereof; (c) the reinforcing layer is directly gripped between the outer sleeve of the end fitting and the ring; (d) the projecting portion of the inner layer provides an annular high pressure sealing member adapted to be forced outwardly by internal fluid pressure within the hose into sealing contact with a seating provided by the outer part of the end fitting; (e) low pressure sealing is obtained by holding the projecting portion of the inner layer between the insert and the outer part of the end fitting; (f) a lip projects rearwardly from the outer part of the end fitting so as to penetrate inside the reinforcing layer between the ring and the projecting portion of the inner layer. By "rearwardly" is meant in the direction axially towards the main body of the hose.

Preferably the reinforcing layer is directly gripped between the sleeve and the ring as the result of contraction of the sleeve.

Low pressure sealing means is needed to prevent leakage when the pressure falls below that at which leakage is prevented by pressure of the projecting portion of the inner layer against its seating on the end fitting.

Low pressure sealing may be obtained by the use of a resilient insert pressing the inner layer against its seating or by constriction of the projecting portion of the inner layer between the insert and the lip as the result of contraction of the lip produced by contraction of the sleeve.

The resilient insert may be a helical spring of which the convolutions open under the pressure exerted by the lip through the inner layer. Alternatively, the inner end of the spring may be protected from this result by a tubular sleeve or cap.

The sealing faces of the inner layer and its seating may be wholly or partly parallel to their axes, and the free end portion of the inner layer may be externally reduced in diameter to render it more responsive to the internal pressure, the seating being appropriately formed to co-operate with said reduced-diameter region. Alternatively, the sealing faces of the inner layer and its seating may taper in the direction away from the end of the outer layer, so long as the projecting portion of the inner layer is constricted between the insert and the lip as the result of contraction of the lip produced by contraction of the sleeve.

The insert may be a rigid tube apertured and/or reduced in external diameter at the outward end to allow fluid to have access to the inside of the inner layer to provide the high pressure sealing.

This tube may be split collet fashion or otherwise formed so that it may exert pressure in a radially outwards direction on the inner layer.

The lip bridges the gap between the outer part of the end fitting and the ring, and thus prevents harmful outward extrusion of the inner layer into this gap. The lip may be replaced by a ring supported against outward pressure at its forward end by the outer part of the end fitting.

According to another form of the invention, the ring, before contraction, internally tapers from a free thin end adjacent the end wall of the outer layer to a thick end, and the thin end is turned in by contraction of the sleeve around it so that the bare reinforcing material is gripped and pulled round the thick end of the ring. This latter end of the ring is preferably of half circular sectional profile and the bottom of a recess formed in the fitting between the sleeve and lip, which receives it, may be of substantially half-circular sectional contour. The ring may be so contracted that its internally tapering face becomes cylindrical and an initially cylindrical external face of the ring and an initially cylindrical internal face of the sleeve are made conical in the finished coupling component.

The invention includes the method of making a flexible hose coupling component of the kind specified, which consists in employing a hose wherein the end portion of the inner layer and the corresponding end portion of the reinforcing layer project beyond the corresponding end of the outer layer, folding the projecting portion of the reinforcing layer away from the projecting portion of the inner layer and grinding the external periphery of said projecting portion of the inner layer to form a sealing member and before or after grinding, assembling the insert and arranging the ring around the region of said projecting portions nearer the end of the outer layer and folding the bare material around said ring, then assembling the outer part of the fitting so that the sleeve thereof surrounds the ring and the bare reinforcing material around it, and then contracting the sleeve so as to grip the reinforcing material between it and the ring, and between the ring and the lip, whereby the hose is secured to the fitting and the sealing member can be pressed by means of internal fluid pressure into sealing relation with its seating on the fitting.

The insert member may be arranged in the sealing member prior to grinding the sealing face. It then serves to support the sealing member during grinding.

We may, where the construction permits, grind the inner layer whilst the ring member is in position and over that region of the projecting inner portion of the inner layer which extends beyond the side of the ring remote from the end of the outer layer, or where necessary grind the inner layer before the ring is applied, then fold the reinforcing material back again towards the sealing member, insert the ring over it and fold the reinforcing material around the ring and finally apply and contract the sleeve.

In order that the present invention may be the more clearly understood, reference is hereinafter made to the accompanying drawings, illustrating by way of example four forms of coupling component according to the invention, Fig. 1 being a sectional elevation of one form and Fig. 2 a sectional elevation of another form, Fig. 3 a sectional elevation of a further form and Fig. 4 a sectional elevation of yet another form. Figs. 5 to 7 show three modified forms of hose coupling components according to the invention in which instead of contracting the outer sleeve, the direct grip of the reinforcing material between the ring and the said sleeve is achieved by screw action.

Referring more particularly to the upper half of Fig. 1, which shows the hose and the end fitting assembled ready for conraction to secure the fitting to the hose, the hose comprises inner and outer tubular layers 1, 2 of resilient material and a flexible reinforcing layer 3 which may consist of ribbon like groups of fine high tensile steel wires braided to tubular form with or without contiguous inner or outer fabric material, or both inner and outer fabric material.

The end portion of the outer layer 2 has been stripped away and the exposed portion of the reinforcing layer separated from the projecting portion 4 of the inner layer, the external periphery of which, from a point near the end of the outer layer has been ground down to a taper. This projecting portion of the inner layer provides a sealing member.

5 is a metal ring which is shouldered at 6 and has an axial extension 7. The end fitting has a sleeve 8 provided with an end wall 9, an extension 10, an annular lip 11 and an inner face machined to a taper 12 (herein termed the seating), extending from an internal shoulder 13 of the extension to the tip 14 of the lip 11.

An insert 15 is also provided formed of closely coiled wire of rectangular section.

The ring 5 is arranged around that part of the sealing member and the corresponding exposed portion 16 of the reinforcing layer nearer the end of the outer layer and the end portion 17 of the reinforcing layer has been folded round said ring. The ring extension 7 projects over the outer layer 2 which has preferably been slightly ground down where it is received in the extension. The sloping shoulder 6 abuts the end of the outer layer.

The sleeve 8 has been forced axially over the said end portion 17 of the reinforcing layer to fold it around the ring 5.

The lip 11 bridges the gap between the end wall 9 and the adjacent end of the ring 5 and intrudes into the space between the reinforcing material 16 within the ring and the sealing member 4. The sleeve has an integral enlarged swaging band 18 positioned around the ring. This enlarged band may alternatively be formed by a separate ring.

The insert 15 has been inserted within the sealing member.

The lower half of the view shows the finished coupling component, the sleeve 8 having been contracted around the ring and the extension 7 around the outer layer. As a result of contraction of the sleeve 8, the ring 5 is contracted, the end portion 17 of the reinforcing layer becomes securely gripped between the sleeve and ring, the reinforcing material is also gripped between the ring and the lip 11, and the lip is bent inwards to grip the sealing member, locally between it and the insert and sufficiently to seal the lip to the sealing member at low internal fluid pressures. The helically coiled spring insert acts as a resistance member and the effect of the contracting operation carried out on the sleeve and the underlying ring is to open the convolutions of the said member, thus increasing its length on either side of the zone where the lip grips the sealing member and allowing the rubber of the inner layer to flow with the extending insert and urge the sealing member snugly on to its seating.

In the form shown in Fig. 2, the sealing member is formed by the free end portion 4a of the projecting portion of the inner layer, this free end portion being of a reduced external diameter compared with that of the inner layer so that the sealing member is the more readily responsive to the internal fluid pressure. The seating 12a is made to correspond with the so-formed sealing member. The cooperating sealing faces of the sealing member and its seating are made parallel to the axes thereof. With such a form, it is not essential that the lip be bent in to grip the projecting portion 4 between it and the insert. In the form illustrated the lip is bent inwards to grip the portion 4 between it and a tubular cap 4b which surrounds the inner end of the spring insert. The spring is not therefore elongated as a result of the bending in of the lip. The portion of the spring insert not surrounded by the cap urges the sealing member 4a against its seating. The upper half of the figure shows the parts before the sleeve 8 is contracted and the lower part after the sleeve has been contracted. Fig. 2 also shows a form in which the extension 10 is separate from the sleeve and its end wall. The separate member is brazed into a central hole in the end wall.

Figure 3:
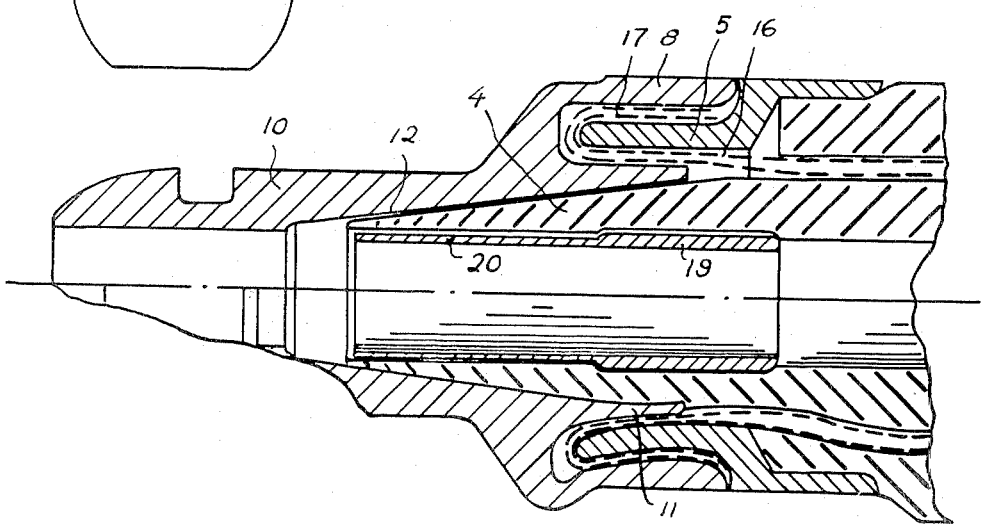

In the form shown in Fig. 3 the insert is in the form of a tube 19 with an extension 20 of reduced diameter, the lip 11 being bent in to grip the sealing member onto the tube 19 and the internal fluid pressure having access to the inside of the sealing member around the extension of the tube. This tube may be split collet fashion or otherwise formed so that it may exert pressure in a radially outward direction on the inner layer.

In the forms depicted the insert is made substantially co-terminous with the smaller end of the sealing member. In an alternative form of Fig. 3 the insert may extend up to the shoulder of the sleeve extension 10, the tube made of uniform diameter and the sealing member made to contact with the external periphery thereof and with the seating and the tube apertured to allow the internal fluid under pressure to have access to the sealing member to force it against the seating.

The sleeve 8 and the extension 10 are shown integral but they may be made of separate parts secured e. g., brazed together, e. g., the sleeve and the end wall may be one part and the extension and lip another part firmly secured in the end wall.

In the form shown in Fig. 5 the outer sleeve 26 is externally screw threaded and its inner face 27 tapers towards the end wall 28, the ring 29 having a correspondingly tapered outer face. A female nut 30 which has previously been slidden along the hose is screwed onto the sleeve causing the bare reinforcing material to be gripped between the sleeve and the ring.

In the form shown in Fig. 6 the outer sleeve 26a is internally screw-threaded and is engaged by a male nut 30a.

In Fig. 7 the outer sleeve 26b is internally screw threaded and the male nut 30b has a wedge end 31. The inner face of the ring is also tapered at a sharper angle and substantially corresponding to the taper of the wedge end 31. In screwing home the nut, the wedge end expands the ring outwards to grip the reinforcing material between itself and the sleeve.

Figs. 5 to 7 employ a sealing member, a seating therefor and a resilient insert substantially corresponding with those parts as illustrated in the previous forms.

The sleeve extension may be constructed in any suitable or well known form for coupling the component to a companion component, e. g., it may have a sealing nipple 21 and an annular groove 22 for coupling to a union nut in the way described and claimed in our Patent No. 2,310,490. The nipple, as shown in the lower half of Fig. 1 may be a separate part brazed or otherwise appropriately secured to the extension 10 at an angle thereto.

The method we preferably adopt of preparing the coupling component for contraction is first cut off an end length of the outer layer of the hose, then to force the reinforcing material away from the projecting portion of the inner layer by means of a finely tapered annular tool having a centering peg fitting into the hose, whereafter the so separated reinforcing material is pressed outwards by a blunt-ended tool also having such a centering peg and flared outwards sufficiently to enable a ring tool to be applied over the flared material so that it is folded within the inside of the ring tool. The portion of the inner layer projecting out of the ring tool can then be readily ground to the desired taper form. The ring tool is then removed and the flared material elastically closed in by a split ring tool so that the ring may be inserted extension first over the reinforcing material. The split ring tool is then removed, the ring forced down until the shoulder abuts the end of the outer layer. The reinforcing material springs out again behind the ring and while the free end of the extension of the ring bears against an abutment (formed by a split ring tool) the sleeve is pressed over the flared material, e. g., by the ram of a press and folds it around the outside of the ring. The insert may be inserted into the hose end before the grinding operation is carried out and it serves to receive a peg for supporting the projecting end of the inner layer during grinding. The sleeve is then contracted, resulting in the ring also being contracted, the end portion 17 of the reinforcing layer being powerfully gripped between the sleeve and the ring, and the lip 11 being bent in and forming the low pressure sealing zone.

In the form shown in Fig. 4, and referring more particularly to the upper half of the view, the metal ring 5a is of a modified form which is internally tapered from a free thin end adjacent to the end of the outer layer 2 of the hose to a thick end which is of substantially semi-circular cross-sectional profile. The thick end of the ring is arranged in a recess formed by the sleeve 8a, its end wall 9a, and the annular lip 11a which intrudes between the bare reinforcing material and the projecting portion 4a of the inner layer 1 of the hose. The bottom of this recess is also of substantially half-circular cross-sectional contour and substantially concentric with that of the thick end of the ring. The projecting portion of the inner layer is externally reduced in diameter between the shoulder 23 and its free end and the seating therefor is shaped to correspond with the external form of the said projecting portion. The sleeve has a swaging band 24 which is arranged and contracted around the thin end of the ring as shown in the lower part of the view so that the conical internal face of the ring is deformed into substantially cylindrical form while the outer cylindrical face of the ring and the inner cylindrical face of the sleeve are deformed into corresponding conical form. The end portion of the bare reinforcing material is gripped between the sleeve and the ring and whilst the band is being contracted the bare reinforcing material is first gripped and then pulled around the thick end of the ring.

The insert is a helical spring 25 which normally presses the sealing member outwards against its seating and allows fluid under pressure within the hose to have access to the inner periphery of the sealing member to press it more strongly against its seating. The pull exerted on the bare material tends to take up any slackness of such material under the ring. This in turn lessens the liability for any relative axial displacement to take place between the hose and the fitting under working conditions. By the arrangement of the sealing faces of the sealing member and its seating parallel to their axes, any slight relative axial displacement which may occur does not take the sealing member off its seating.

In this form the end portion of the outer layer is cut away, the projecting end portion of the reinforcing material separated from the projecting end portion of the inner layer, and the ring applied over the bare reinforcing material and the latter folded about the ring, and held back by a suitable tool to expose the outer surface of that region of the projecting portion of the inner layer extending beyond the ring. This surface is to provide the sealing face of the sealing member and is then ground, the tool removed and the sleeve applied as shown in the lower part of the view.

The sleeve need not have an enlarged swaging band, e. g., it may be of uniform wall thickness.

When it is stated that the reinforcing layer is bare, it is intended to include constructions in which there is on the layer a contiguous fabric cover or a layer of rubber so thin that when gripping takes place it is substantially entirely forced into the interstices of the reinforcing layer. Where such fabric material is present, we prefer however to remove it so that the metal is directly gripped.

If the hose has inner and outer resilient layers, two or more reinforcing layers and one or more intervening resilient layers, preferably the outer reinforcing layer is exposed and gripped between sleeve and ring, the intervening resilient layer(s) and the inner reinforcing layer(s) being removed or ground off to expose the projecting inner resilient layer to form the sealing member. Alternatively, the inner reinforcing layer may be exposed and gripped between the sleeve and the ring, the outer reinforcing layer(s) and the intervening and outer resilient layers being removed.

When it is stated that the outer sleeve or lip is contracted it is meant that it is of such metal, and is subjected to such pressure that a permanent deformation is produced; suitable metals are brass, aluminum alloy, low carbon steel and phosphor bronze.

There may be a supplementary ring contracted between the sleeve and the bare reinforcing material.

Either or each ring or the sleeve may consist of soft metal. The reinforcing material may then be nonmetallic because the said material can be gripped without damage.

What I claim is:

1. A flexible hose coupling component of the kind specified employing a flexible hose with inner and outer tubular layers of resilient material and a tubular layer of flexible reinforcing material embedded between them, and an end fitting comprising an outer part including a sleeve, an annular lip and a seating, said fitting comprising a resilient insert and a ring, the end portion of the inner resilient layer projecting beyond the outer layer and the reinforcing layer also projecting beyond the outer layer and being bare of the inner layer, said reinforcing material passing through the inside of the said ring and being folded back on the outside thereof, the reinforcing layer being directly gripped between the outer sleeve and the ring, said projecting portion of the inner layer providing an annular high pressure sealing member adapted to be forced by internal fluid pressure within the hose into sealing contact with said seating and being pressed by the said resilient insert against its seating to form a low pressure seal, said lip projecting rearwardly from the said outer part of the end fitting so as to penetrate under the fold of the reinforcing material and inside the said reinforcing layer between the ring and the projecting portion of the inner layer.

2. A flexible hose coupling component according to claim 1, in which said insert is a helical spring.

3. A flexible hose coupling component according to claim 2, in which there is a tubular cap on the inner end of the insert between which and the lip the inner layer is gripped.

4. A flexible hose coupling component according to claim 1, in which the insert is a split tube which is formed and arranged to exert yielding pressure in a radially outward direction on the projecting portion of the inner layer and to allow fluid to have access to the inside of the inner layer.

5. A flexible hose coupling component of the kind specified employing a flexible hose with inner and outer tubular layers of resilient material and a tubular layer of flexible reinforcing material embedded between them, and an end fitting by which the component may be coupled to other apparatus comprising an outer part including a sleeve, an inner annular lip and a seating; and said fitting comprising an insert and a ring, the end portion of the inner resilient layer projecting beyond the outer layer and the reinforcing layer also projecting beyond the outer layer and being bare of the inner layer, the reinforcing layer passing through the inside of said ring and being folded back on the outside thereof, the reinforcing layer being directly gripped as the result of contraction of the said outer sleeve between such sleeve and the ring, said projecting portion of the inner layer providing an annular high pressure sealing member adapted to be forced by internal fluid pressure within the hose into sealing contact with said seating, said insert being resilient and pressing the inner layer against said seating to provide a low pressure seal, said lip projecting rearwardly from the said outer part of the end fitting so as to penetrate under the fold of the reinforcing material and inside the said reinforcing layer between the ring and the projecting portion of the inner layer.

6. A hose coupling component according to claim 5, in which a constriction of the projecting portion of the inner layer between said lip and said insert is present as the result of the contraction of said outer sleeve.

7. A flexible hose coupling component employing a flexible hose with inner and outer tubular layers of resilient material and a tubular layer of flexible reinforcing material embedded between them, and an end fitting comprising an outer part including a sleeve, an inner annular lip and a seating, and said fitting comprising a ring and a resilient insert, the end portion of the inner resilient layer projecting beyond the outer layer and the reinforcing layer also projecting beyond the outer layer and being bare of the inner layer, said reinforcing material passing through the inside of the ring and being folded back on the outside thereof, the reinforcing layer being gripped as a result of the contraction of the outer sleeve between said sleeve and the ring, said projecting portion of the inner layer providing an annular high pressure sealing member adapted to be forced by internal fluid pressure within the hose into sealing contact with said seating, said resilient insert pressing the inner resilient layer against its seating to form a low pressure seal, the sealing faces of the inner layer and its seating being at least partly parallel to their axis, said lip projecting rearwardly from the said outer part of the end fitting so as to penetrate under the fold of the reinforcing material and inside the said reinforcing layer between the ring and the projecting portion of the inner layer.

8. A flexible hose coupling component of the kind specified employing a flexible hose with inner and outer tubular layers of resilient material and a tubular layer of flexible reinforcing material embedded between them, and an end fitting comprising an outer part including a screw threaded sleeve, a seating, an inner annular lip and a nut and said fitting also comprising a ring, and a resilient insert, the end portion of the inner resilient layer projecting beyond the outer layer and the reinforcing layer also projecting beyond the outer layer and being bare of the inner layer, said reinforcing material passing through the inside of said ring and being folded back on the outside thereof, the reinforcing layer being directly gripped between said sleeve and ring as the result of pressure on the ring of a nut screwed to the sleeve at the rearward end thereof, said projecting portion of the inner layer providing an annular high pressure sealing member adapted to be forced by internal fluid pressure within the hose into sealing contact with said seating and being pressed by the said resilient insert against its seating to form a low pressure seal, the sealing faces of the inner layer and its seating being at least partly parallel to their axis, said lip projecting rearwardly from the said outer part of the end fitting so as to penetrate under the fold of the reinforcing material and inside the said reinforcing layer between the ring and the projecting portion of the inner layer.

References Cited in the file of this patent

UNITED STATES PATENTS

| Number | Name | Date |
|---|---|---|
| 2,090,250 | Cowles | Aug. 17, 1937 |
| 2,150,471 | Van Vulpen | Mar. 14, 1939 |
| 2,273,398 | Couty | Feb. 17, 1942 |
| 2,394,632 | Parker | Feb. 12, 1946 |
| 2,431,522 | Trevaskis | Nov. 25, 1947 |
| 2,610,869 | Allison | Sept. 16, 1952 |
| 2,638,361 | Melsom | May 12, 1953 |